US010427090B2

(12) United States Patent
Dube et al.

(10) Patent No.: US 10,427,090 B2
(45) Date of Patent: Oct. 1, 2019

(54) CONTROL OF SWING ADSORPTION PROCESS CYCLE TIME WITH AMBIENT $CO_2$ MONITORING

(71) Applicants: Olivier Dube, Amherst, NY (US); Cem E. Celik, Grand Island, NY (US); Thomas A. McNamara, East Amherst, NY (US)

(72) Inventors: Olivier Dube, Amherst, NY (US); Cem E. Celik, Grand Island, NY (US); Thomas A. McNamara, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 122 days.

(21) Appl. No.: 15/787,035

(22) Filed: Oct. 18, 2017

(65) Prior Publication Data
US 2019/0111377 A1 Apr. 18, 2019

(51) Int. Cl.
*B01D 53/04* (2006.01)
*B01D 53/047* (2006.01)
*G05D 21/00* (2006.01)

(52) U.S. Cl.
CPC ....... *B01D 53/0454* (2013.01); *B01D 53/047* (2013.01); *B01D 53/0462* (2013.01); *B01D 53/0407* (2013.01); *B01D 2257/504* (2013.01); *G05D 21/00* (2013.01)

(58) Field of Classification Search
CPC ............ B01D 53/0454; B01D 53/0462; B01D 53/047; B01D 53/0407; B01D 2257/504; G05D 21/00
USPC ........... 95/8, 11, 14, 15, 19, 21, 23, 96, 117, 95/129, 139, 143; 96/109
See application file for complete search history.

(56) References Cited

U.S. PATENT DOCUMENTS

| | | | | |
|---|---|---|---|---|
| 3,808,773 A | | 5/1974 | Reyhing et al. | |
| 4,127,395 A | * | 11/1978 | McKey | B01D 53/261 95/10 |
| 4,693,730 A | * | 9/1987 | Miller | B01D 53/047 95/12 |
| 5,989,313 A | * | 11/1999 | Mize | B01D 53/0454 95/10 |
| 6,402,809 B1 | | 6/2002 | Monereau et al. | |
| 6,599,347 B2 | | 7/2003 | Kalbassi et al. | |
| 7,413,595 B2 | | 8/2008 | Schmidt et al. | |
| 7,744,676 B2 | | 6/2010 | Leitmayr et al. | |
| 7,846,237 B2 | | 12/2010 | Wright et al. | |
| 2006/0130650 A1 | * | 6/2006 | Givens | B01D 53/047 95/96 |
| 2006/0162556 A1 | | 7/2006 | Ackley et al. | |
| 2010/0242722 A1 | * | 9/2010 | Belanger | B01D 53/0462 95/8 |
| 2013/0269519 A1 | * | 10/2013 | Taylor | B01D 53/047 95/25 |
| 2014/0308176 A1 | * | 10/2014 | Golden | C01B 21/0416 422/187 |

FOREIGN PATENT DOCUMENTS

EP 2 111 905 A1 10/2009

* cited by examiner

Primary Examiner — Frank M Lawrence, Jr.
(74) Attorney, Agent, or Firm — Ralph J. Mancini

(57) ABSTRACT

The present invention relates to a method of controlling prepurifier cycle time by monitoring ambient $CO_2$ level in order to prevent $CO_2$ breakthrough occurrences caused by extreme instantaneous variations in ambient $CO_2$ level. Rather than operating solely by prepurifier design bed capacity, the method of the invention continuously updates bed capacity for the contaminants using the feed temperature, pressure and contaminants composition, calculating the total amount of contaminants that were fed to the prepurifier during the feed step and estimates the perturbation front velocity, i.e., the velocity at which the contaminants front coming from an extreme instantaneous variations of ambient level is going to propagate inside the adsorbents bed. Estimating the perturbation front velocity allows for a more precise estimate of the maximum time remaining for the feed step before starting to experience $CO_2$ breakthrough. This eliminates the need to switch the online bed unnecessarily early and risking shorter regeneration for the offline bed.

18 Claims, 2 Drawing Sheets

CONTROL OF SWING ADSORPTION PROCESS CYCLE TIME WITH AMBIENT $CO_2$ MONITORING

FIELD OF THE INVENTION

The present invention relates to a method for controlling prepurifier cycle time by monitoring ambient $CO_2$ level in order to prevent unexpected $CO_2$ breakthrough occurrences caused by extreme instantaneous variations in ambient $CO_2$ level.

BACKGROUND OF THE INVENTION

In cryogenic processes it is necessary to remove carbon dioxide, water and other high boiling materials from the feed gas stream since they will liquefy or solidify at low temperatures leading to pressure drops and flow difficulties in the downstream process. It is also desirable to remove hazardous and/or explosive contaminants from the feed gas to reduce the risk of build-up in the subsequent processes. These contaminants are typically removed using cyclic adsorptive gas purification processes.

Cyclic adsorptive gas purification processes typically employ one of two general classes of adsorption systems, namely: temperature swing adsorption (TSA) systems and pressure swing adsorption (PSA) systems. These adsorption systems typically contain two or more adsorbers that contain adsorbents for removal of impurities from a feed gas. The adsorbers are usually described to be operating in a production state also referred to as an adsorption state or in the regeneration state. The adsorber in the production state is also referred to as being online. The adsorber in the regeneration state is also referred to as being offline. In the production state of both TSA and PSA systems, a feed gas stream is contacted with an adsorbent bed in the adsorber to produce a purified gas stream. The adsorber may contain one or more adsorbents. A given adsorbent selectively adsorbs one or more impurities present in the feed gas stream. In processes where air is the feed gas, water and carbon dioxide are typically removed by contacting the feed gas with one or more adsorbents which adsorb water and carbon dioxide. The water adsorbent material typically is silica gel, alumina or a molecular sieve and the carbon dioxide adsorbent material typically is a molecular sieve, for example, a zeolite. Water is typically removed first, followed by carbon dioxide by passing the feed stream/air through a one or more adsorbent layers chosen for their selectivity in adsorbing water and carbon dioxide. At the end of the production state, the flow of feed gas to the adsorber is shut off. In the regeneration state of both TSA and PSA systems, the contaminant laden adsorbent bed is exposed to a flow of regeneration gas which facilitates desorption of impurities from the adsorbent and removal of desorbed impurities out of the adsorber (e.g. carbon dioxide and water to regenerate the adsorbent material for further use. The regeneration gas in the regeneration state conventionally flows in a direction counter current to that of the feed gas flow in the production state. In the TSA system, the regeneration gas employed is a heated regeneration gas, provided at a temperature higher than that of the feed gas. Typically the temperature of heated regeneration gas is in the range of about 200° F. to about 600° F. The heated regeneration gas heats the adsorbent and facilitates regeneration of the adsorbent by desorption of impurities. The adsorbent has a lower adsorptive capacity at higher temperature. The heated regeneration gas serves as a hot purge gas that removes the desorbed impurities from the adsorber. This is then followed by a cooling step that involves flowing a near ambient temperature regeneration gas to cool the adsorbent, push out the heat front through the adsorbent bed, and make it ready for adsorption step. The PSA system in an air separation plant employs a waste gas stream produced within the air separation plant as regeneration gas. The waste gas is typically at a temperature close to the feed air temperature, and is provided to the PSA system at a pressure above the atmospheric pressure, sufficient to overcome the pressure drops and to be able to be discharged to the atmosphere. The adsorbed impurities in the PSA are desorbed due to the lower adsorptive capacity at lower pressures. The PSA regeneration gas serves as a purge gas that facilitates the regeneration of the adsorbent by desorption of impurities and removal of the desorbed impurities from the adsorber.

In cryogenic air separation plants, the cyclic adsorptive gas purification system can contain one or more adsorbers, referred to as prepurification units or prepurifiers, and produce purified air for distillation at cryogenic temperatures by adsorbing impurities in feed air. By using at least two adsorbers in a parallel arrangement, the cyclic adsorptive gas purification system can be operated in a continuous mode; for example one adsorber can be operated in an adsorption state while the other adsorber is being regenerated and their roles are periodically reversed in the operating cycle, with equal periods being devoted to the adsorption state and to the regeneration state. Typically, such systems contain adsorbers that are substantially cylindrical in shape, and may have their axis with respect to feed flow as axial (vertical or horizontal), or of the radial type.

A conventional TSA process cycle for purifying air is generally described to contain the following steps: a) production of purified air by adsorption of impurities in feed air flowing through an adsorber at super atmospheric pressure and at ambient temperature for a pre-determined time period;
   b) initiating regeneration of the adsorbent by stopping the feed air flow and depressurizing the adsorber to a lower operating pressure, typically near atmospheric pressure;
   c) regeneration of the adsorbent in the depressurized adsorber by flowing a heated regeneration gas also referred to as hot purge gas for a pre-determined time period; an example of a heated regeneration gas is waste nitrogen produced in the air separation unit that is heated by means of one or more heaters/heat exchangers;
   d) cooling the regenerated adsorbent in the adsorber to push out residual heat in the adsorbent bed by flowing cool waste gas;
   e) repressurizing the adsorber with purified air coming, for example, from another adsorber in the production phase;
   f) bringing the repressurized adsorber online
and repeating steps (a) thru (e). Less conventionally, the regeneration may be carried out at a pressure substantially different from atmospheric pressure, either greater or even less than the ambient pressure by using suitable vacuum pumping means.

A conventional PSA process cycle for purifying air is usually described to contain:
   a) production of purified air by adsorption of impurities in feed air flowing through an adsorber at super atmospheric pressure for a pre-determined time period;

b) initiating regeneration of the adsorbent by stopping feed air flow and depressurizing the adsorber to a lower operating pressure, typically near atmospheric pressure;

c) regeneration of the adsorbent in the depressurized adsorber by flowing a purge gas for a pre-determined time period; an example of a purge gas is waste nitrogen produced in the air separation unit;

d) repressurizing the adsorber with purified air coming, for example, from another adsorber in production phase;

e) bringing the repressurized adsorber online, and repeating steps (a) thru (d). The PSA process cycle is distinguished from the TSA process cycle in that the regeneration gas is not heated. Adsorbent bed cooling step is not required since the adsorbent doesn't get heated by the regeneration gas. The PSA cycle time is typically much shorter compared to the TSA cycle time.

Extreme instantaneous variations in ambient contaminant levels, for example $CO_2$, can occur in highly populated regions and areas of dense industrial activity. Variations in contaminant levels can lead to significant and sometime unexpected contaminant breakthrough at the outlet of the prepurifier. Contaminant breakthrough can occur even in cases where the average contaminant level observed during the feed step is lower than the average contaminant level the prepurifier was designed to handle and where the feed step duration is shorter than design. Depending on the magnitude of these ambient contaminant spike events, a plant trip can occur. If too frequent, those contaminant breakthrough events can lead to plant shutdown.

This invention proposes to integrate a control of a thermal, pressure, and/or hybrid swing adsorption prepurifier operation cycle time by monitoring the ambient contaminant levels being fed to a prepurifier in order to avoid contaminant breakthrough at the outlet of the prepurifier caused by extreme instantaneous variations in ambient contaminant level.

SUMMARY OF THE INVENTION

The present invention relates to a method of controlling prepurifier cycle time by monitoring ambient $CO_2$ level in order to prevent $CO_2$ breakthrough occurrences caused by extreme instantaneous variations in ambient $CO_2$ level. Rather than operating solely by prepurifier design bed capacity, the method of the invention continuously updates bed capacity for the contaminants using the feed temperature, pressure and contaminants composition, calculating the total amount of contaminants that were fed to the prepurifier during the feed step and estimates the perturbation front velocity, i.e., the velocity at which the contaminants front coming from an extreme instantaneous variations of ambient level is going to propagate inside the adsorbents bed. Estimating the perturbation front velocity allows for a more precise estimate of the maximum time remaining for the feed step before starting to experience $CO_2$ breakthrough. This eliminates the need to switch the online bed unnecessarily early and risking shorter regeneration for the offline bed.

DETAILED DESCRIPTION OF THE INVENTION

Figure 1:
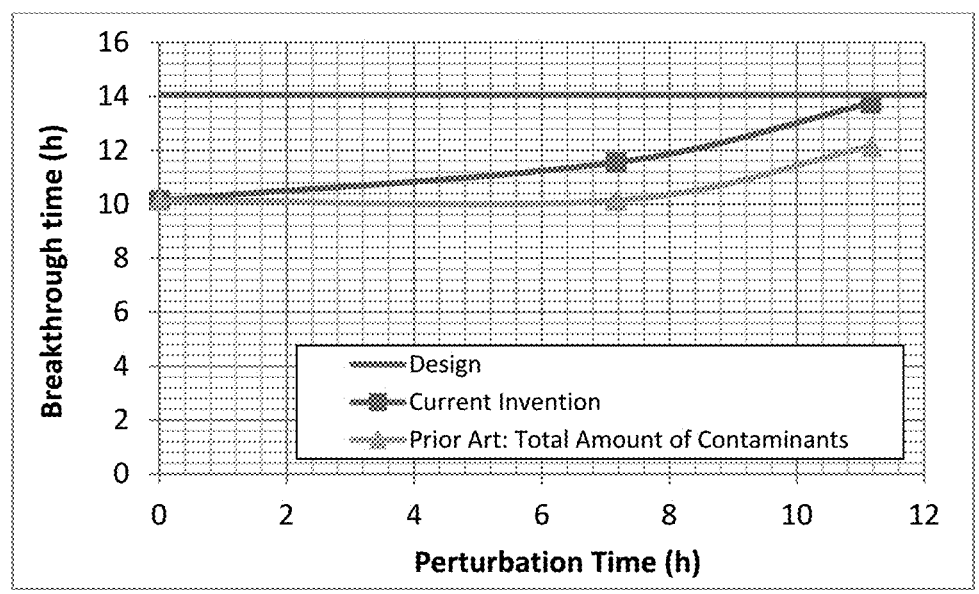
FIG. 1 plots the expected contaminant breakthrough time of the current invention vs prior art.

Cyclic adsorption processes are processes wherein a bed of adsorbent is used to selectively adsorb one or more species from a process stream, wherein the adsorbent bed is regenerated in a proceeding step by raising the temperature of the bed and or reducing the pressure, thereby releasing the selectively adsorbed species. Operation under certain conditions allow a selective component or components in a gas mixture to be preferentially adsorbed within the pore structure of porous adsorbent materials relative to a second component or components in the gas mixture. In such unit, air prepurification can be accomplished using adsorbents that may be arranged as discrete beds or layers, as mixtures, composites or combinations thereof. The adsorbents used are, without being limiting, zeolites, activated aluminas, silica gels, exchanged zeolites, doped aluminas, etc.

In a process for removal of contaminants from a gas mixture by adsorption, it is common to adsorb contaminants successively in the order of decreasing adsorptivity and/or decreasing selectivity with respect to a chosen adsorbent. Selectivity can often be improved by operating the adsorption process under specific pressure and temperature conditions since both pressure and temperature influence the adsorption loading of the components to a different extent. The effectiveness of the adsorption process can often be improved by using a combination of adsorbents, configured in layers or mixtures, to enhance the removal of each contaminant, i.e. by selecting particular adsorbents to achieve maximum adsorptivity and/or selectivity of each contaminant relative to the gas mixture. The use of different adsorbents disposed in layers in the adsorber is well known in the art. The selection of an adsorbent to remove a particular contaminant depends upon many factors, e.g. the type and composition of both the targeted contaminant and other gases in the mixture at the point of removal within the adsorber, the relative selectivity of the adsorbent for the contaminant(s) and non-contaminants, and the loading capacity of the adsorbent for the contaminant. The adsorptive capacity is the total amount adsorbed of each component in the material, and the selectivity of the adsorption for a specific component over another component. Species are desorbed because adsorption isotherms are strongly influenced by temperature.

Prepurifier beds used in air separation units are designed to remove contaminants that can be found in air such as $CO_2$, $H_2O$, $C_2H_2$, $N_2O$, various hydrocarbons, and the like. The most frequent contaminants to be removed are $H_2O$ and $CO_2$. Each contaminant is usually removed from the air stream within a specific zone of the prepurifier containing a specific adsorbent. Prepurification unit typically contains a first layer of activated alumina to remove water and a second layer of molecular sieve to remove carbon dioxide. The size of each layer of adsorbent is based on temperature, pressure, flow, contaminants concentration and desired cycle time. The design contaminants concentration used is typically the one that will be observed during normal operation of the prepurifier. The adsorber bed is designed to remove contaminants based on expected operating conditions such as feed flow, feed pressure, feed temperature and feed contaminants composition. The design bed capacity of the adsorber bed specifies the total amount of adsorbate that the adsorbents can remove without experiencing contaminant breakthrough at these expected feed operating conditions.

Extreme instantaneous variations in ambient adsorbate levels can occur depending on a variety of factors. For example, extreme variations of $CO_2$ concentration can occur at highly industrial sites or regions. These variations in ambient $CO_2$ concentration can lead to significant and sometime unexpected $CO_2$ breakthrough at the outlet of the prepurifier. Because of these spikes in ambient $CO_2$ concentration, $CO_2$ breakthrough can occur in cases where the average $CO_2$ concentration observed during the feed step is lower than the average $CO_2$ level the prepurifier was designed to handle. $CO_2$ breakthrough can also occur in cases where the feed step duration is shorter than design. Depending on the magnitude of these ambient $CO_2$ spike events, a plant trip can occur. If too frequent, those $CO_2$ breakthrough events can lead to plant shutdown.

In one embodiment, extreme variations of ambient adsorbate levels is defined as adsorbate levels that are greater than or equal to +/−10% of the ambient adsorbate levels that the prepurifier was designed to handle. In another embodiment, extreme variations of ambient adsorbate levels is defined as adsorbate levels that are greater than or equal to +/−20% of the ambient adsorbate levels that the prepurifier was designed to handle, and in yet another embodiment, greater than or equal to +/−25% of the ambient adsorbate levels that the prepurifier was designed to handle.

The present invention controls the repurifier operation cycle time by monitoring the ambient adsorbate levels being fed to a prepurifier in order to avoid adsorbate breakthrough at the outlet of the prepurifier caused by extreme instantaneous variations in ambient adsorbate levels. The method of the invention can be employed in various swing adsorption processes, including temperature, pressure and/or hybrid temperature/pressure swing adsorption processes. A hybrid temperature/pressure swing adsorption process is defined as an adsorption process that comprises any combination of TSA and PSA processes. In conventional cyclical swing adsorption process at least two adsorption beds are utilized wherein one adsorber bed is in an on-stream mode, during which adsorbate is adsorbed from a feed gas mixture passing through the bed, while a second adsorber bed is in a regeneration mode, during which the adsorbate is desorbed from the bed. The beds alternate between said modes, wherein the time required to complete the on-stream mode is conventionally determined by the design bed capacity for the adsorbate. The maximum time that an adsorber bed can remain in the on-stream mode without experiencing contaminant breakthrough is defined as the "predicted breakthrough time". A temperature swing adsorption process ("TSA") process is described below in order to illustrate the method of the invention.

TSA Process Cycle

A conventional TSA prepurifier process has two general states. In a first state, a two adsorber system may be employed where one or both may be "online". When only one adsorber is receiving feed air then that adsorber is said to be in "Feed" step, producing all the purified air supplied to the downstream production unit in the air separation plant. When both adsorbers are receiving feed air then those adsorbers are said to be in "Blend" step, each contributing to the purified air supplied to said downstream production unit. While online, the adsorber removes impurities such as water and carbon dioxide in the feed air by adsorption. The adsorber that is not "online" is in an "offline" or regeneration state. Such regeneration state includes four distinct steps, in the following order: depressurization; adsorbent regeneration by desorption at an elevated temperature compared to the feed temperature; adsorbent cooling; and adsorber re-pressurization. In order to conduct these various steps, various valves are opened or closed to provide the necessary fluid flow pathways or isolation in a periodic fashion in order to create a continuous product air stream.

A heat source is required to increase the temperature of the regeneration gas to a desired elevated temperature, in the range of about 200° F. to about 600° F. which is needed to be able to regenerate the adsorbent fully. All or a portion of waste gas produced in the downstream production unit is provided as a regeneration gas source. Immediately following depressurization of the adsorber, the regeneration gas source provides a heated regeneration gas at a temperature of about 200° F. to about 600° F. to the adsorber. Depending on which adsorber is receiving the heated regeneration gas, the gas is allowed to flow for a pre-determined period, followed by switching off the heat source. Waste gas stream now bypasses the heater and is introduced into the offline adsorber to cool the adsorbent. The adsorbent cooling step is conducted for a pre-determined time period to cool the adsorbent to a desired temperature prior to switching the adsorber from offline state to online state and repeating the cycle.

A TSA cycle for removing impurities such as water and carbon dioxide from air is designed to operate an adsorber in the production state or in the regeneration state for a pre-defined time period referred to as cycle time, typically in the range of about 2 hours to about 10 hours. In the production state, the adsorber produces a purified air stream from feed air. In the regeneration state, the impurities laden adsorbent in the adsorber is regenerated at elevated temperatures by desorbing the impurities loaded onto the adsorbent during the production state. The time period during which heated regeneration gas flows through the adsorber can range from about 15% to about 60% of the total regeneration state cycle time, with the balance utilized for adsorbent cooling step. For example, when the total regeneration state cycle time is 4 hours then the time period during which heated regeneration gas flows can range from 36 minutes to 2 hours, and when the total regeneration state cycle time is 10 hours then the time period during which heated regeneration gas flows can range from 90 minutes to 5 hours. The flow rate of regeneration gas during the elevated temperature desorption step and the adsorbent cooling step can be the same or different as long as enough regeneration energy is provided and the adsorbent is cooled to a desired temperature prior to starting the next production state. Cycle times under 4 hours have a hard time pushing the heat front through the bed and would require a higher flow rate of regeneration gas during the adsorbent cooling step to cool the adsorbent to a desired temperature within the allocated time. Cycle times above 10 hours are possible but less desirable because of the requirements of significant amount of adsorbent material and a larger vessel which increases capital cost. The cooler gas pushes the heat front through the adsorber to prepare it for the next feed step. Once a sufficient amount of heat is pushed out, as determined for example by a temperature probe on the feed end inside the adsorber, the adsorber is re-pressurized by shutting off the flow of adsorbent cooling gas to the adsorber, and opening and closing appropriate valves to build pressure within the adsorber by: diverting a portion of the purified air stream produced in the online adsorber, or diverting a portion of the pressurized air stream being fed to the online adsorber, or combinations thereof. In the online mode the adsorber operates at an elevated pressure, for example in the range of about 30 psia to about 600 psia to provide purified air at sufficient pressure for producing one or more of oxygen, nitrogen, and argon products in the downstream production section. During regeneration at elevated temperature the adsorber operates at a pressure close to atmospheric pressure that is sufficient to vent the regeneration gas leaving the adsorber, although any pressure below the online mode operating pressure will work. The repressurized adsorber is then brought back online and the TSA cycle steps are repeated.

In the method of the invention, the time required to complete the on-stream mode is not based on design bed capacity, but rather is based on a recalculated or updated bed capacity. More specifically, the feed flow, temperature and pressure as well as the feed contaminant concentration are all continuously monitored and these measurements are used to calculate a new estimate of the time a prepurifier can remain online based on the recalculated bed capacity and not the design bed capacity. This is done by updating the prepurifier bed capacity for the contaminants using the feed temperature, pressure and contaminants composition, calculating the total amount of contaminants that were fed to the prepurifier so far during the current feed step and by estimating the perturbation front velocity, i.e., the velocity at which the contaminants front coming from an extreme instantaneous variations of ambient level is going to propagate inside the adsorbents bed. Estimating the perturbation front velocity allows for a more precise estimate of the maximum time remaining for the feed step before starting to experience $CO_2$ breakthrough. This eliminates the need to switch the online bed unnecessarily early and risking shorter regeneration for the offline bed.

In equilibrium separations, a gas mixture is passed through a bed of adsorbent particles and the more strongly-adsorbed gas component (heavy) is retained, while the other components (light) emerge from the exit of the adsorber. At the beginning of the adsorption step, a mass transfer zone forms and moves through the bed. Nearly all of the adsorption occurs within this zone. The concentration of the gas to be removed decreases from its concentration in the feed mixture to a very low value over the length of this zone. In some separation processes, this zone quickly reaches a constant length (usually significantly smaller than the overall depth of adsorbent bed) and moves through the bed at a constant speed. If relatively high purity light product is desired, the adsorption step must be stopped (and subsequently followed by a regeneration step) when the front of the zone just begins to erupt at the bed exit. At this instant, the bed contains the mass transfer zone near the exit and the remainder of the bed is fully saturated with the more strongly held component in equilibrium with the feed concentration of this component. The part of a bed located between the inlet of the main adsorption zone and the rear of the mass transfer zone is known as the "equilibrium zone". If the bed is made shorter than the length of the mass transfer zone, then the component to be removed will breakthrough the bed immediately at the beginning of the adsorption step. When instantaneous variations in ambient contaminant level occur, a second mass transfer zone can develop on top of the equilibrium zone. This is referred here as a "perturbation front". Just like the mass transfer zone, this perturbation front will moves through the bed at a given velocity. The perturbation front velocity is a function of the feed gas conditions (i.e. flow, pressure, temperature and contaminants concentration). The perturbation front velocity can be obtained directly through the use of a process model of the prepurifier, a digital twin (or virtual twin) model of the prepurifier/plant or even through empirical correlation derived either from actual plant data (experimental measurements) or process modeling. When there is no instantaneous variation of ambient adsorbate levels, the perturbation front velocity is basically zero.

Modeling work performed using Aspen Adsorption demonstrate that the $CO_2$ spike concentration and duration, the time in the feed step when the $CO_2$ spike occur as well as the normal ambient $CO_2$ concentration are all factors that affect $CO_2$ breakthrough time of the prepurifier. The $CO_2$ spike can be pictured as a wave passing through the prepurifier as the perturbation front moves through the bed. Even though a higher $CO_2$ partial pressure from the $CO_2$ spike will result in a higher $CO_2$ solid loading on the adsorbent, this extra $CO_2$ adsorbed will eventually desorb once the $CO_2$ ambient levels go back to normal condition inside the bed. The desorbed $CO_2$ will then be re-adsorbed further down the prepurifier bed. This phenomenon can significantly reduce the prepurifier $CO_2$ breakthrough time. When the $CO_2$ spike occurs more toward the end of the feed step, the impact on the $CO_2$ breakthrough time is reduced. Without wishing to be bound to any particular theory, it is believed that this is due to insufficient time before the end of feed step for the $CO_2$ levels to go back to normal condition inside the bed, thus reducing the amount of extra $CO_2$ being desorbed. Thus, simply looking at the total amount of $CO_2$ fed to the prepurifier bed during the feed step is insufficient to conclusively and accurately determine when $CO_2$ breakthrough will occur. Looking at the average ambient $CO_2$ concentration during the whole feed step is also insufficient to determine if/when $CO_2$ breakthrough will occur. $CO_2$ spikes can result in shorter breakthrough times even if the beds are designed for a higher than current average ambient $CO_2$ concentration. It is therefore important to understand at what velocity the perturbation front travels.

Figure 2:
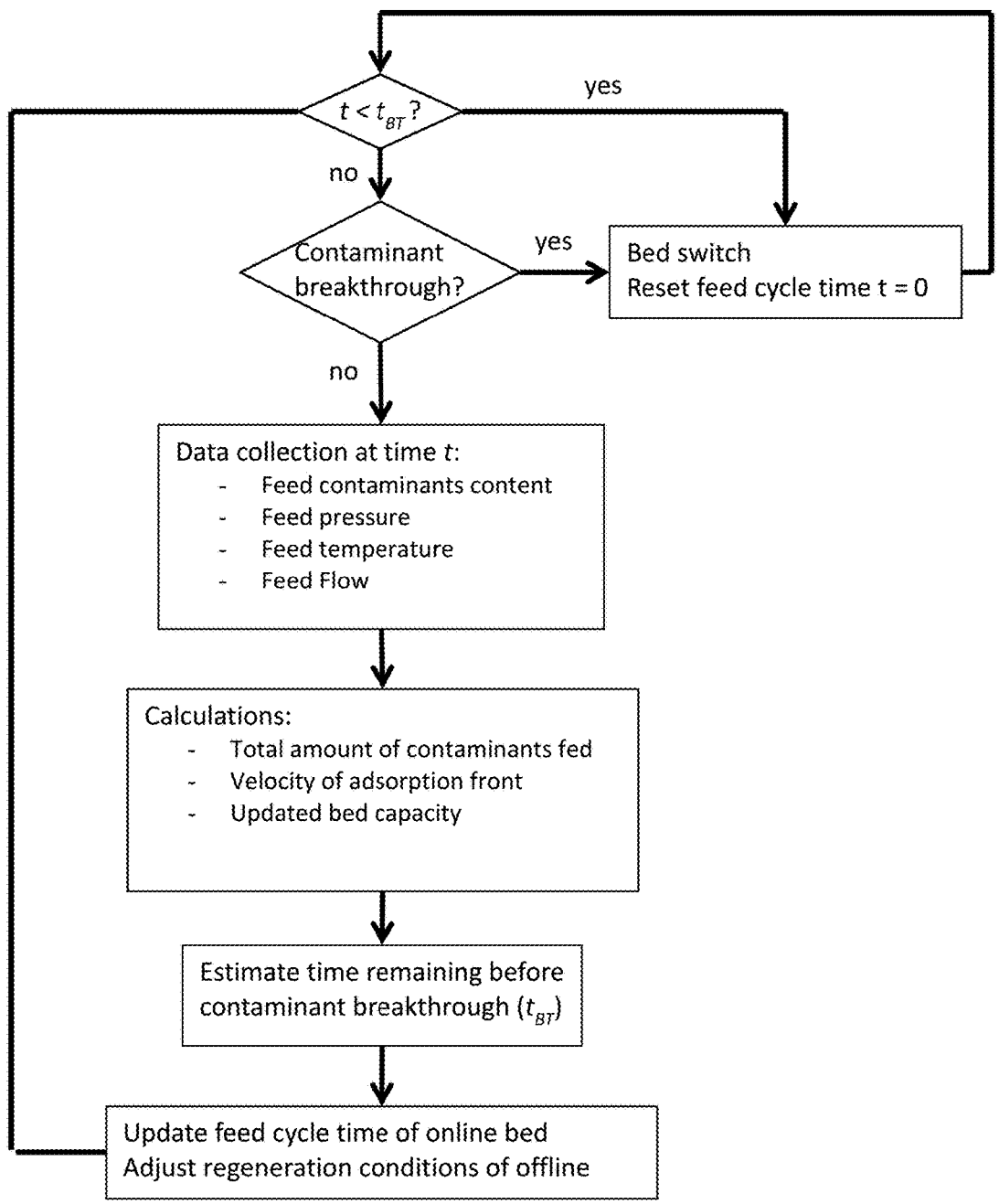
FIG. 2 is a flowchart summarizing the steps of the invention.

The present invention provides a method for maximizing the time that an adsorbent bed can remain online in a TSA, PSA or hybrid TSA/PSA process without experiencing breakthrough of the unwanted component of the feed gas mixture. This is done by updating the prepurifier bed capacity for the contaminants using the feed temperature, pressure and contaminants composition, calculating the total amount of contaminants that were fed to the prepurifier so far during the current feed step and by estimating the velocity at which the contaminants front coming from an extreme instantaneous variations of ambient level is going to propagate inside the adsorbents bed. Estimating the perturbation front velocity is essential to accurately estimate maximum time remaining for the feed step. The regeneration conditions of the bed being regenerated are then properly adjusted to insure that it will be completed before or at the same time that the feed step of the online prepurifier bed will be done. The adjusted regeneration conditions could be the purge flow, the purge temperature and/or the hot purge time. The flowchart in FIG. 2 summarizes the steps of the invention.

The first step consists of evaluating if the current feed time is lower than the current prediction of the breakthrough time. If it is the case, the beds are switched and the online bed is put offline and the offline bed is put online. If it is not the case, the second step consists of verifying that the adsorption bed is not experiencing contaminant breakthrough. If it is the case, the online bed is put offline and the offline bed is put online. If it is not the case, the feed contaminant, feed pressure, feed temperature and feed flow monitored data are used to calculate the total amount of contaminants fed to the adsorption bed up to this point and estimate the perturbation front velocity of the adsorbate through the adsorbent bed. These calculations are then used to update the bed capacity and provide a new estimate of the predicted contaminant breakthrough time. If needed, the maximum feed cycle time of the online bed is updated and the regeneration conditions of the offline bed are adjusted so that the regeneration mode is completed just prior to, or at the same time as the online mode.

The invention will now be demonstrated by the following non-limiting examples.

Example 1

A TSA prepurifier bed was designed considering ambient $CO_2$ levels of 405 ppm. Assuming that the prepurifier is operated at the design feed flow, temperature and pressure, the maximum time this prepurifier is expected to remain in the feed step is close to 14 hours and a specific amount of contaminants can be removed under these conditions. Three scenarios of extreme instantaneous variation of ambient $CO_2$ level were considered. The instantaneous variation was in the order 1200 ppm $CO_2$ (instead of 405 ppm) for 2 hours. The first scenario assumed the perturbation occurred in the beginning of the feed step, the second scenario assumed the perturbation occurred in the middle of the feed step and the third assumed the perturbation occurred towards the end of the feed step. FIG. 1 compares the maximum time the prepurifier is expected to remain in the feed step according to the present invention wherein the contaminants perturbation front velocity was accounted and compares it against a known method where only the total amount of contaminants fed to the prepurifier bed is considered. For all three scenarios, the perturbation front velocity was calculated and the average value was found to be $0.5 \times 10^{-4}$ m/s. This calculation was done using data provided by an adsorption process model of the described scenarios. Given that value and the size of the adsorbents bed, it was found that, for the first scenario, the perturbation front will have time to catch up to the bed main mass transfer front and that is why the results from this invention and the prior art are identical. However, for the second and third scenarios, the perturbation front doesn't have enough time to fully catch up to the main transfer front and/or propagate all the way to the end of the adsorption bed given its velocity. This means that the adsorption bed capacity is greater than the designed one. Thus, the breakthrough time (or the maximum time) that this adsorption bed can remain online can be extended.

The data clearly show that considering only the total amount of contaminants according to known methods significantly under predicts the actual time a bed can remain in the feed step. This means that according to known methods the online bed is taken offline prematurely. This also means that more aggressive regeneration conditions would need to be used to insure that the other prepurifier bed is ready to be put online at the same time the current bed needs to be put offline. According to the method of the invention, the bed can remain online for up to 2 additional hours depending on when the $CO_2$ perturbation happened in the feed step. As explained above, the further in the feed step a perturbation in the feed contaminants composition occurs, the smaller the impact on the online time.

Example 2

Alternatively, two different scenarios were considered for the same prepurifier bed design used in Example 1. The first scenario assumed that the ambient level throughout the entire feed step was constant at 350 ppm instead of 405 ppm. The second one assumed that a perturbation in the feed $CO_2$ composition occurred at the beginning of the feed cycle (1200 ppm $CO_2$ for 2 hours) and that the contaminants level dropped to 350 ppm for the remaining time of the feed step. The table below presents the expected $CO_2$ breakthrough times using the current invention and compares it to the one expected if only the total amount of contaminants fed was considered as prior art calculates. As shown in Table 1, if only the total amount of contaminants is considered, the expected $CO_2$ breakthrough time is higher than the one predicted by the method of the invention. This results in passing a significant amount of $CO_2$ to the air separation unit. The method of the invention provides a more accurate estimate of the real $CO_2$ breakthrough time since the perturbation front velocity was taken into account and the bed capacity for $CO_2$ was continuously updated using the feed temperature, pressure and flow conditions as well as the $CO_2$ concentration. Additionally, the data show that with prior art methods, the prepurifier can experience $CO_2$ breakthrough even though it was designed to remove a greater amount of contaminants.

TABLE 1

| | $CO_2$ breakthrough time estimation method | |
|---|---|---|
| Scenarios | Current invention | Prior Art: Total amount of contaminants |
| 350 ppm $CO_2$, entire feed step | 15.3 h | 16.3 h |
| 1200 ppm $CO_2$ for 2 h, then 350 ppm $CO_2$ | 10.5 h | 11.4 h |

One economic advantage of present invention over the prior art is a more accurate prediction of the adsorbate/contaminant (e.g. $CO_2$) breakthrough time. Having a more accurate prediction of the breakthrough time enables a better estimation of the purge requirements and thus can lead to a reduction of power consumption from compressors and/or regeneration heater and a reduction of blowdown loss. It can also prevent plant trips due to contaminants breakthrough above the critical operating parameter (COP) or plant shutdowns because of contaminants accumulation in the units downstream of the adsorption bed.

One of ordinary skill in the art will recognize that the invention can be applied to air prepurification, syngas prepurification and can also be applied to contaminants other than $CO_2$, such as $N_2O$, $C_2H_2$ and other hydrocarbons. The invention is applicable when a TSA type prepurifier beds and can also be utilized with hybrid TSA/PSA prepurifier beds.

We claim:

1. A method for maximizing the time an adsorbent bed can remain online in feed mode in a swing adsorption process without experiencing breakthrough of adsorbate, wherein said swing adsorption process comprises at least two adsorbent beds each having a predetermined design bed capacity, wherein one adsorber bed is online in feed mode during which adsorbate is adsorbed from a feed gas mixture passing through the bed, while another adsorbent bed is in regeneration mode, during which the adsorbed component is desorbed from the bed, wherein the beds alternate between said modes, said method comprising:
    a) Repeatedly measuring the feed gas flow rate, feed gas temperature, feed gas pressure and the concentration levels of adsorbate in said feed gas during the on-stream mode;

b) Calculating the perturbation front velocity of the adsorbate through the adsorbent bed when there is a an instantaneous variation of ambient levels of said adsorbate in the feed gas;

c) Calculating the breakthrough time of said adsorbate based on the perturbation front velocity of said adsorbate through the adsorbent bed, and d) Updating the bed capacity and the online cycle time to maximize the time that the adsorbent bed can remain online in feed mode without experiencing breakthrough of said adsorbate.

2. The method of claim 1 wherein the feed cycle time to the adsorbent bed is extended if the calculated breakthrough time is greater than the design bed capacity, or shortened if the calculated breakthrough time is shorter than the design bed capacity.

3. The method of claim 1 which comprises at least two adsorbent beds wherein one adsorbent bed is online during which adsorbate is adsorbed from the feed gas mixture passing through the bed, while another adsorbent bed is in regeneration mode, during which the adsorbed adsorbate is desorbed from the bed, wherein the beds alternate between said modes, and wherein the regeneration parameters of the second bed are adjusted based on the updated bed design feed time to ensure that sufficient purge is provided prior to bed switch and that the regeneration mode is completed just prior to, or at the same time as the online mode.

4. The method of claim 1 wherein said adsorbent process is a TSA, PSA or hybrid TSA/PSA process.

5. The method of claim 1 wherein said feed gas mixture comprises air and/or syngas.

6. The method of claim 1 wherein the adsorbate is $CO_2$ and/or $N_2O$ and/or $H_2O$ and/or hydrocarbons.

7. The process of claim 1 wherein the concentration of the adsorbate is monitored by measurement in the feed gas mixture upstream of the on-stream adsorbent bed or by measurement in the on-stream adsorbent bed.

8. The process according to claim 1 wherein the regeneration mode operating conditions are adjusted to insure that regeneration will be completed just prior to, or at the same time that the feed mode of the online bed is completed, wherein the operating conditions to be adjusted are purge flow, purge temperature, hot purge time, or combinations thereof.

9. An air separation process wherein air is compressed in a main air compressor to provide compressed air and wherein carbon dioxide is removed from the compressed air by a cyclical swing adsorption process comprising one adsorbent bed in an on-stream mode, during which carbon dioxide is adsorbed from the compressed air on the adsorbent bed to provide a carbon dioxide-free air feed, while another adsorbent bed is in a regeneration mode, during which the carbon dioxide is desorbed from the bed, and said beds alternate between said modes; and the carbon dioxide-free air feed is fed to an air separation unit to provide at least one product stream enriched in a component of the carbon dioxide-free air feed, wherein the time required to complete the on-stream mode is determined by:

monitoring the feed gas flow rate, feed gas temperature, feed gas pressure and the concentration levels of the adsorbate in said feed gas during the on-stream mode;

calculating the perturbation front velocity of the adsorbate through the bed;

calculating the breakthrough time of said adsorbate based on the perturbation front velocity of said adsorbate through the bed; and updating the bed capacity and feed cycle time to maximize the time the adsorbent bed can remain on line in feed mode without experiencing breakthrough of the adsorbate.

10. The process of claim 9 wherein the regeneration mode operating condition is modified in response to the updated bed capacity and feed cycle time and the new estimate of the time that the adsorbent bed can remain online.

11. The air separation process according to claim 10 wherein the concentration of the adsorbate is monitored by measurement in the feed gas mixture upstream of the on-stream adsorbent bed, or by measurement in the on-stream adsorbent bed.

12. A method for improving prepurifier cycle time efficiency in a TSA, PSA or hybrid TSA/PSA process for the removal of $CO_2$ from a feed gas mixture, said method comprising:

a) determining the feed cycle time based on design bed capacity of the prepurifier bed;

b) monitoring the feed gas flow rate, feed gas temperature, feed gas pressure and the concentration levels of $CO_2$ in said feed gas during the on-stream mode and calculating the perturbation front velocity of the $CO_2$ through the bed;

c) calculating the breakthrough time of the $CO_2$ based on the perturbation front velocity of $CO_2$ through the bed; and d) updating bed capacity and feed cycle time to maximize the time the adsorbent bed can remain on line without experiencing $CO_2$ breakthrough.

13. The method of claim 12 wherein the time that the feed gas is fed to the adsorbent bed is extended if the $CO_2$ breakthrough time is greater than the feed cycle time based on design bed capacity, or shortening if the $CO_2$ breakthrough time is shorter than the feed cycle time based on design bed capacity.

14. The method of claim 12 which wherein said TSA, PSA or hybrid TSA/PSA process comprises at least two adsorbent beds wherein the first adsorber bed is online during which $CO_2$ is adsorbed from the feed gas mixture passing through the bed, while the second adsorbent bed is in regeneration mode during which the adsorbed $CO_2$ is desorbed from the bed, wherein the beds alternate between said modes, and wherein the regeneration parameters of the second bed are adjusted based on the updated bed capacity and feed cycle time of the first bed to ensure that sufficient purge is provided prior to bed switch and that the regeneration mode is completed just prior to, or at the same time as the on-stream mode.

15. The method of claim 12 wherein said feed gas mixture comprises air and/or synas.

16. The method of claim 14 wherein $CO_2$ concentration is monitored by measurement in the feed gas mixture upstream of the on-stream adsorbent bed, or by measurement in the on-stream adsorbent bed.

17. The method of claim 14 wherein the regeneration mode operating conditions are adjusted to insure that regeneration will be completed just prior to, or at the same time that the feed mode of the online bed is completed, wherein the operating conditions to be adjusted are purge flow, purge temperature, hot purge time, or combinations thereof.

18. A TSA or hybrid TSA/PSA process cycle for purifying air which comprises:

a) production of purified air by adsorption of impurities in feed gas flowing through an adsorber comprising an adsorbent bed having a predetermined design bed capacity for a pre-determined time period;

b) initiating regeneration of the adsorbent by stopping the feed air flow and depressurizing the adsorber to a lower operating pressure;
c) regenerating the adsorbent in the depressurized adsorber by flowing a heated regeneration gas through the adsorbent for a pre-determined time period;
d) cooling the regenerated adsorbent in the adsorber to push out residual heat in the adsorbent bed by flowing cool waste nitrogen through the adsorbent;
e) repressurizing the adsorber with purified air;
f) bringing the repressurized adsorber online and repeating steps (a) thru (e), wherein said process further comprises monitoring the feed gas flow rate, feed gas temperature, feed gas pressure and the concentration levels of $CO_2$ in said feed gas during the on-stream mode; estimating the perturbation front velocity of $CO_2$ through the bed; calculating the breakthrough time of the $CO_2$ based on the perturbation front velocity of $CO_2$ through the bed, and updating the bed capacity and feed cycle time to maximize the time the adsorbent bed can remain on line in feed mode without experiencing $CO_2$ breakthrough.

\* \* \* \* \*